Patented May 2, 1950

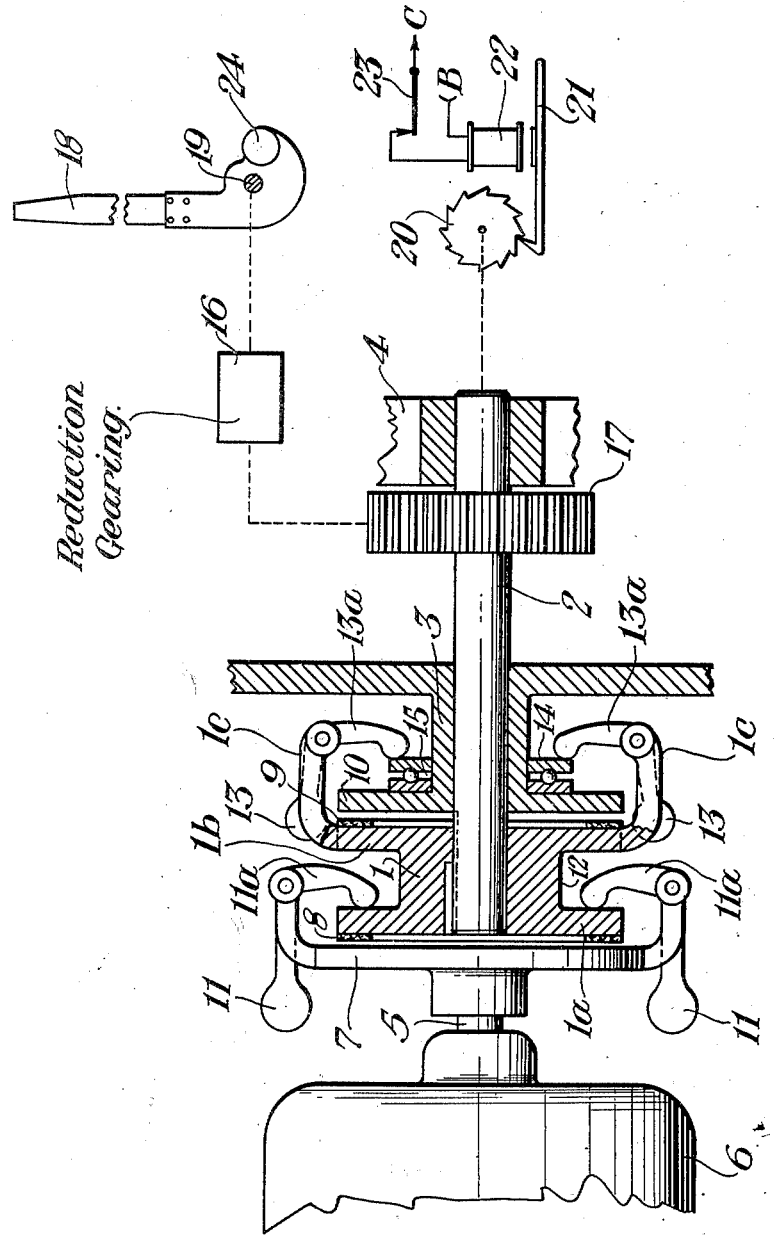

2,505,940

UNITED STATES PATENT OFFICE 2,505,940

RAILWAY CROSSING GATE HAVING COMBINED CENTRIFUGAL CLUTCH AND BRAKE

Herbert L. Bone, Forest Hills, Pa., assignor to The Union Switch & Signal Company, Swissvale, Pa., a corporation of Pennsylvania Application June 24, 1946, Serial No. 678,980

5 Claims. (Cl. 39—7)

My invention relates to a railway crossing gate having combined centrifugal clutch and brake.

In one well-known form of highway crossing gate shown and described in Letters Patent of the United States No. 2,137,196, granted to H. C. Sampson on September 8, 1942, the gate arm is arranged to move by gravity from its raised to its lowered position and to be returned to its raised position by an electric motor. Heretofore the motor for moving the gate arm from its lowered to its raised position has been a special slow speed motor which was constantly connected with the gate arm and which was therefore driven in the reverse direction while the gate arm was being lowered by gravity. It has now been proposed to replace this special slow speed motor by a high speed commercial motor, and when this is done, it is desirable to have the motor disconnected from the gate arm while the gate arm is moving to its lowered position to prevent any possibility of the gate arm being held in its raised position due to friction and binding which might develop in the motor bearings or in the necessary reduction gearing. Furthermore, when the motor is disconnected from the gate arm during the descent of the gate arm, it then becomes necessary to provide a friction brake to limit the lowering speed of the gate arm to the desired value.

One object of my invention is to provide a centrifugally operated clutch which functions only when the motor is energized to operatively connect the motor with the gate arm, combined with a centrifugally operated brake which has less centrifugal movement than the clutch, and which is therefore effective to apply a brake to the gate arm only when the gate arm is being lowered.

Another object of my invention is to provide a clutch and brake of the type described which is reliable in operation, but which at the same time in inexpensive to construct and maintain.

According to my invention, a shaft which is connected with the gate arm by a suitable gear train, and which is to be driven by the motor to effect the raising of the gate arm, is journaled in suitable bearings in axial alignment with the motor shaft with its one end disposed contiguous to a flange provided on the motor shaft. Mounted on the said one end of the shaft to rotate therewith, but free to slide longitudinally along the shaft, is a collar provided on both ends with flanges carrying friction linings. This collar is adapted to slide along the shaft between a first longitudinal position in which the one set of linings frictionally engage the motor flange and another longitudinal position in which the other set of linings engage a fixed flange, and is arranged to be moved to its first longitudinal position by a first centrifuge secured to the motor flange, and to be moved to its other longitudinal position by a second centrifuge secured to the collar. The parts are so proportioned that the first centrifuge has more centrifugal moment than the second centrifuge, and it follows, therefore, that whenever the motor is energized, the one centrifuge will exert sufficient torque on the collar to move it to and hold it in a longitudinal position in which the motor becomes connected with the shaft, but that, when the motor is deenergized and the gate arm is allowed to descend by gravity the one centrifuge will remain stationary and the other centrifuge will then be effective to move the collar to its other longitudinal position in which it will exert a braking force on the shaft opposing its rotation, which braking force will be effective to limit the lowering speed of the gate arm to a predetermined value.

Other objects and characteristic features of my invention will become apparent as the description proceeds.

I shall describe one form of combined clutch and brake embodying my invention, and shall then point out the novel features thereof in claims.

The accompanying drawing is a view partly in elevation, partly in cross-section and partly diagrammatic showing a combined clutch and brake embodying my invention applied to a highway crossing gate.

Referring to the drawing, the combined clutch and brake as here shown comprises a collar 1 slidably secured by a feather key or the like to one end of a shaft 2 journaled in spaced bearings 3 and 4. The shaft 2 is mounted in axial alignment with the shaft 5 of an electric motor 6, and has the end which supports the collar 1 disposed adjacent to a flange 7 secured to the motor shaft 5. The collar 1 is provided at its opposite ends with flanges 1a and 1b carrying brake discs 8 and 9, and is adapted to be moved longitudinally along the shaft 2 between a left-hand extreme position in which the brake disc 8 engages the motor flange 7 and a right-hand extreme position in which the brake disc 9 engages a fixed brake flange 10 formed on one end of the bearing 3. The collar is adapted to be moved to its left-hand extreme position by means of a first centrifuge comprising a plurality of centrifuge weights 11 pivotally attached to the motor flange and provided with integral fingers 11a which cooperate with the collar within a groove 12 formed between the two flanges 1a and 1b. The collar is adapted to be moved to its right-hand extreme position by means of a second centrifuge comprising a plurality of centrifuge weights 13 pivotally supported by laterally projecting arms 1c formed on the flange 1b of the collar. The weights 13 are provided with integral fingers 13a which bear at their inner ends against a bearing race 14 forming part of an antifriction bearing 15 surrounding the bearing 3 at the right-hand side of the fixed flange 10.

The shaft 2 may be connected with any suitable load which is to be at times driven by the motor and to at other times act as a driving force for the shaft independently of the motor. As here shown, this load is the gate arm 18 of a highway crossing gate, which arm is fixed on a shaft 19 for rotation between a vertical position in which it is shown in the drawing and a horizontal position spaced substantially 90° from said vertical position. The shaft 2 is operatively connected with the gate arm 18 through the medium of suitable operating mechanism which forms no part of my present invention and which is not therefore shown in detail in the drawing. For purposes of my present invention it is sufficient to point out that this operating mechanism includes suitable reduction gearing 16 shown diagrammatically in the drawing except for the one gear wheel 17 which is keyed to the drive shaft 2. This operating mechanism also includes a ratchet wheel 20 operatively connected with the shaft 2 and cooperating with a pawl 21 controlled by an electromagnet 22. The electromagnet 22 is arranged to be energized from the terminals B and C of a suitable source of current not shown in the drawing over an energizing circuit including a contact 23 which becomes closed whenever the gate arm is moved to its raised position and which remains closed as long as it is desired to retain the gate arm in its upper position. The gate arm is biased to its lowered position by gravity, and is connected with counterweights 24 which enable the gravity bias to be adjusted to the desired value. It will be obvious that if the electromagnet 22 is energized when the gate arm is in its upper position the ratchet wheel 20 and pawl 21 will act to hold the gate arm in this position in opposition to its gravity bias, but that when the gate arm is in its upper position and the magnet becomes deenergized, the gate arm will move to its lowered position under the influence of gravity and will thus act through the reduction gearing to drive the shaft 2.

The operation of the clutch and brake embodying my invention as a whole is as follows. The motor 6 will usually be energized when and only when it is desired to move the gate arm from its lowered or horizontal position to its raised or vertical position, but in certain applications of my invention it may also at times become energized to drive the gate arm part way from its raised to its lowered position. When the motor becomes energized the resultant rotation of the motor flange 7 will cause the centrifuge weights 11 carried thereby to exert a force on the collar 1 which will cause it to move laterally along the shaft 2 toward the left to the position in which the brake disc 8 secured to the collar frictionally engages the motor flange, whereupon the collar 1, and hence the shaft 2, will be constrained to rotate with the motor flange to thereby move the gate arm 18 in one direction or the other depending upon the direction of rotation of the motor. As soon as the collar 1 starts to rotate, the centrifuge weights 13 secured thereto will exert a force on the collar which opposes that due to the centrifuge weights 11 carried by the motor flange. The parts are so proportioned, however, that the centrifuge carried by the motor flange will exert a considerably greater centrifugal moment than that carried by the collar, and it follows therefore that as long as the motor remains energized it will continue to exert a driving force on the shaft 2. The control circuits for the motor 6 are not shown because the control circuits form no part of my present invention. These control circuits, however, may be similar to those shown and described in the above referred to Sampson Patent No. 2,137,196, and it will be sufficient for a clear understanding of my present invention to point out that these circuits are so arranged that they will act to automatically deenergize the motor 6 when the gate arm has been driven by the motor to the desired position. It should be noted that if the motor is still rotating due to its inertia when the gate arm reaches its upper extreme position the clutch formed by the motor flange 7 and clutch lining 8 will slip and will thus relieve the strain on the parts. It should also be noted that due to the fact that this clutch will slip it will perform the same function as the usual slip clutch which has heretofore been provided for the purpose of relieving strains on the apparatus at the end of the gate arm stroke. When the gate arm has been driven to its upper position by the motor the magnet 22 will be energized and the gate arm will therefore be arrested in its upper position by engagement of the ratchet pawl 21 with the ratchet wheel 20, as will be obvious.

When the gate arm occupies its upper position, as shown in the drawing, and the magnet 22 becomes deenergized to permit the gate arm to lower, if the motor 6 is then deenergized as will usually be the case, the torque exerted by the gate arm will act through the reduction gearing 16 to drive the shaft 2 in the opposite direction from that in which it is driven when the motor is energized to raise the gate arm. When the shaft 2 is rotated under these conditions, the collar 1 will of course be constrained to rotate with the shaft due to its keyed connection with the shaft, and the centrifuge comprising the centrifuge weights 13 carried by the collar 1 will therefore exert a force on the collar which tends to move the brake disc 8 out of engagement with the motor flange and the brake disc 9 into engagement with the brake flange 10. Since the motor is now stationary the centrifuge comprising the centrifuge weights 11 secured to the motor flange will exert substantially no force on the collar 1, and as a result the total force developed by the centrifuge comprising the centrifuge weights 13 will be available to move the collar to its right-hand or braking position. The braking force exerted by the friction between the brake lining 9 and the brake flange 10 under these conditions will depend, of course, upon the proportioning of the parts, and the parts are so proportioned that this force will be sufficient to limit the lowering speed of the gate arm to the desired value.

One advantage of a combined clutch and brake embodying my invention is that it insures that the clutch will function to connect the motor with the shaft 2 when and only when the motor is energized and that the brake will function to limit the speed of movement of the gate arm when and only when the motor is deenergized.

Another advantage of a combined clutch and brake embodying my invention is that the brake will be effective to prevent damage to the parts in the event the gate arm is broken off and the counterweight tends to move the mechanism to its clear position.

A further advantage of a combined clutch and brake embodying my invention is that it is relatively simple in construction, involves a minimum number of parts, is reliable in operation and can be manufactured and maintained at a relatively low cost.

Although I have herein shown and described only one form of combined clutch and brake embodying my invention, it is to be understood that various changes and modifications may be made therein within the scope of the appended claims without departing from the spirit and scope of my invention.

Having thus described my invention, what I claim is:

1. In combination, a rotatable shaft adapted to be at times driven by a first means and at other times by a second means, a collar constrained to rotate with said shaft but free to move longitudinally between a first position in which it operatively connects said first means with said shaft and a second position in which it is effective to exert a frictional drag on said shaft, a first centrifuge operated in response to operation of said first means for moving said collar to its first position and a second centrifuge operated by rotation of said shaft for moving said collar to its second position, the parts being so proportioned that said first centrifuge will exert a greater centrifugal moment than said second centrifuge, whereby said first means will become connected with said shaft when and only when said first means is operating and a frictional drag will be exerted on said shaft when and only when said shaft is rotated by said second means.

2. In combination, a rotatable shaft adapted to be at times driven by a motor and at other times by other means, a collar constrained to rotate with said shaft but free to move longitudinally between a first position in which it operatively connects said motor with said shaft and a second position in which it is effective to exert a frictional drag on said shaft, a first centrifuge operated in response to rotation of said motor for moving said collar to its first position and a second centrifuge operated by rotation of said shaft for moving said collar to its second position, the parts being so proportioned that said first centrifuge will exert a greater centrifugal moment than said second centrifuge, whereby said motor will become connected with said shaft when and only when said motor is energized and a frictional drag will be exerted on said shaft when and only when said shaft is rotated by said other means.

3. In combination, a motor, a rotatable shaft adapted to be at times driven by said motor and at other times by other means, a collar constrained to rotate with said shaft but free to move longitudinally between two extreme positions, a clutch lining provided on one end of said collar, a brake lining provided on the other end of said collar, a clutch flange provided on said motor in a position to be engaged by said clutch lining when said collar is moved to its one extreme position, a fixed brake flange adapted to be engaged by said brake lining when said collar is moved to its other extreme position, a first centrifuge mounted on said clutch flange and cooperating with said collar for moving it to its one extreme position, a second centrifuge mounted on said collar for moving said collar to its other extreme position, the parts being so proportioned that said first centrifuge will exert a greater centrifugal moment than said second centrifuge, whereby said motor will become connected with said shaft when and only when said motor is energized and a frictional drag will be exerted on said shaft when and only when said shaft is rotated by said other means.

4. In combination, a highway crossing gate arm biased to a lowered position, a first shaft operatively connected with said gate arm and adapted to be driven in one direction by an electric motor to move said gate arm in opposition to its bias from its lowered to a raised position and in the opposite direction by said gate arm when said gate arm is moving to its lowered position due to its bias, a collar constrained to rotate with said shaft but free to move longitudinally between a first position in which it operatively connects said motor with said shaft and a second position in which it is effective to exert a frictional drag on said shaft, a first centrifuge operated in response to rotation of the motor for moving said collar to its first position and a second centrifuge operated by rotation of said shaft for moving said collar to its second position, the parts being so proportioned that said first centrifuge will exert a greater centrifugal moment than said second centrifuge, whereby said motor will become connected with said shaft when and only when said motor is energized and a frictional drag will be exerted on said shaft when and only when said shaft is rotated by said gate arm moving to its lowered position.

5. In combination, a rotatable shaft, a first driving means for said shaft, a clutch for at times connecting said first driving means with said shaft, a second means constantly connected with said shaft and adapted to be at times driven thereby and at other times to drive said shaft, a brake for at times applying a frictional drag to said second shaft, said brake and said clutch being interconnected in such manner that said clutch and said brake cannot both become connected with said shaft at the same time, a first centrifuge operated by said first driving means and effective to automatically operate said clutch to connect said first driving means with said shaft when said first driving means is operated, and a second centrifuge responsive to rotation of said shaft and effective to operate said brake to cause it to exert a frictional drag on said shaft when and only when said shaft is rotated by said second means.

HERBERT L. BONE.

REFERENCES CITED

The following references are of record in the file of this patent:

UNITED STATES PATENTS

| Number | Name | Date |
|---|---|---|
| 940,786 | Cook | Nov. 23, 1909 |
| 1,773,243 | Stewart | Aug. 19, 1930 |
| 2,010,925 | Nakashian | Aug. 13, 1935 |
| 2,372,579 | Jefferson et al. | Mar. 27, 1945 |
| 2,388,946 | Beall | Nov. 13, 1945 |